July 18, 1933.　　　A. F. MASURY　　　1,918,853
ENDLESS TRACK FOR MOTOR VEHICLES
Filed Feb. 10, 1932　　　4 Sheets-Sheet 1
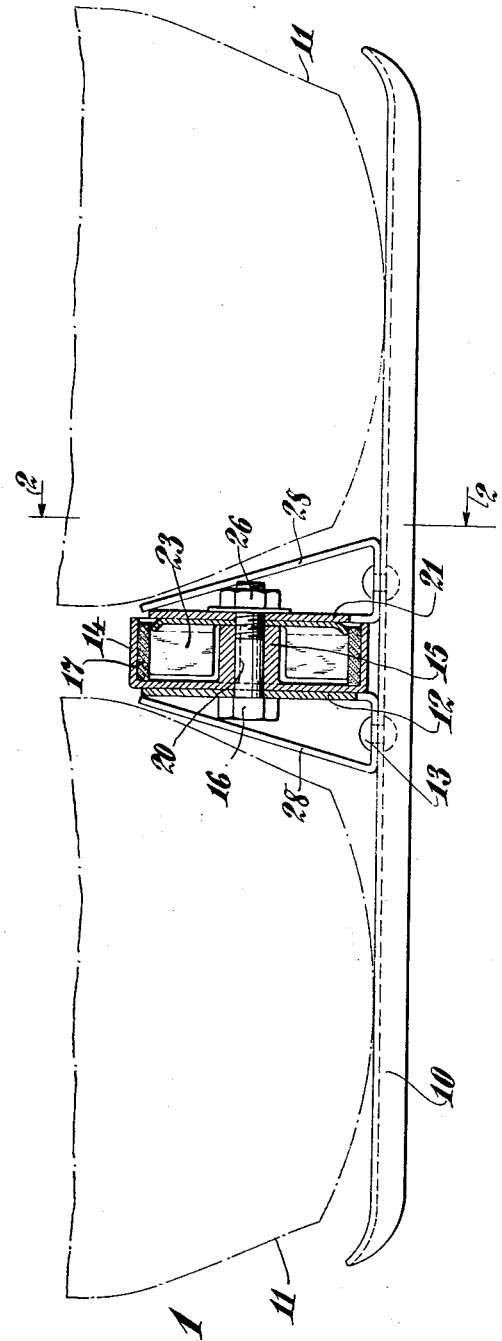
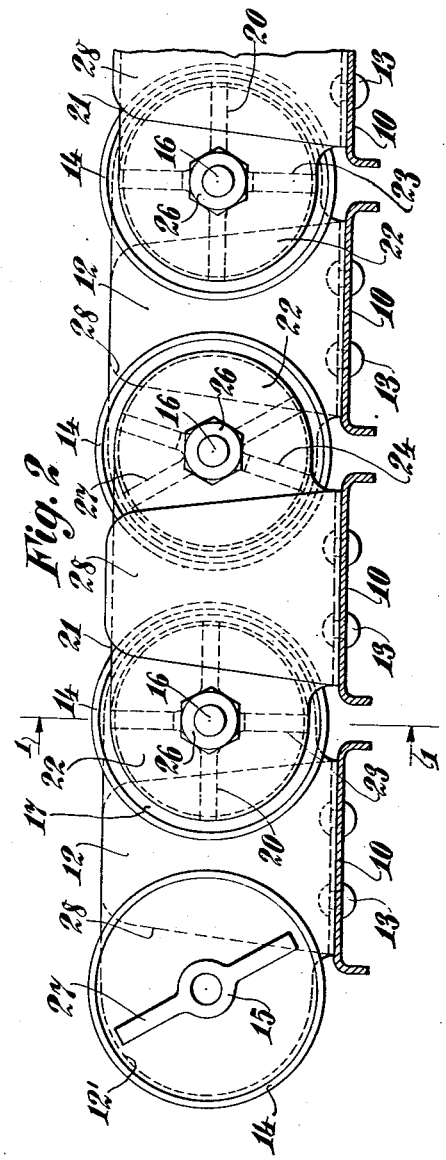
INVENTOR
Alfred F. Masury,
BY
Redding, Greeley, O'Shea & Campbell
HIS ATTORNEYS July 18, 1933.  A. F. MASURY  1,918,853
ENDLESS TRACK FOR MOTOR VEHICLES
Filed Feb. 10, 1932   4 Sheets-Sheet 2

INVENTOR
Alfred F. Masury,
BY Redding, Greeley, O'Shea & Campbell
HIS ATTORNEYS

July 18, 1933.  A. F. MASURY  1,918,853
ENDLESS TRACK FOR MOTOR VEHICLES
Filed Feb. 10, 1932  4 Sheets-Sheet 3
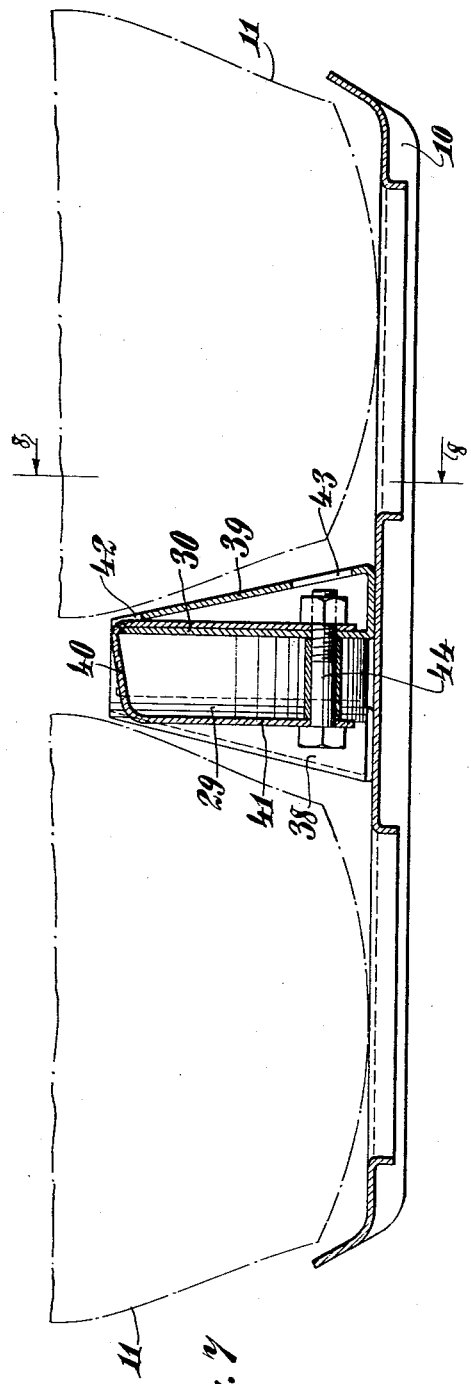
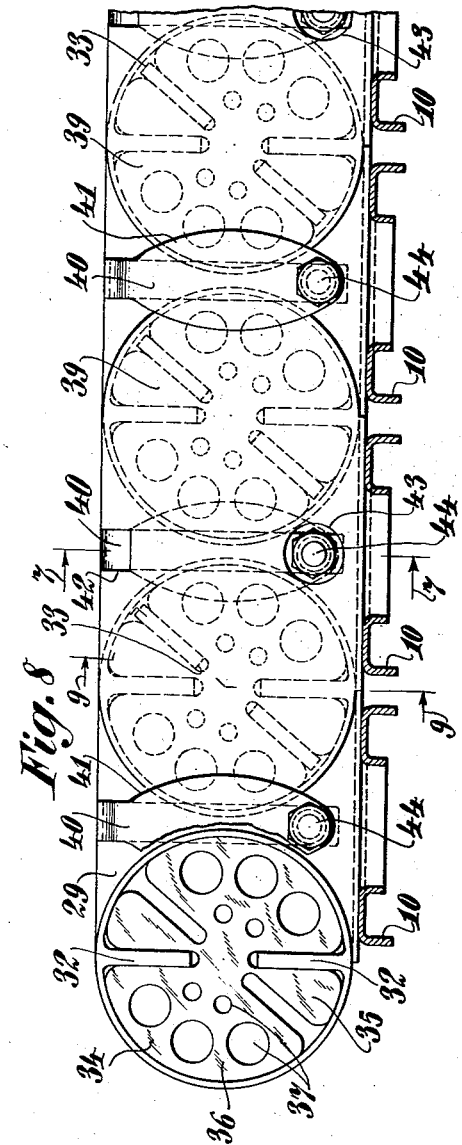
INVENTOR
*Alfred F. Masury,*
BY
*Redding, Greeley, O'Shea + Campbell*
HIS ATTORNEYS July 18, 1933. A. F. MASURY 1,918,853
ENDLESS TRACK FOR MOTOR VEHICLES
Filed Feb. 10, 1932 4 Sheets-Sheet 4
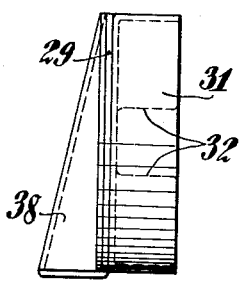
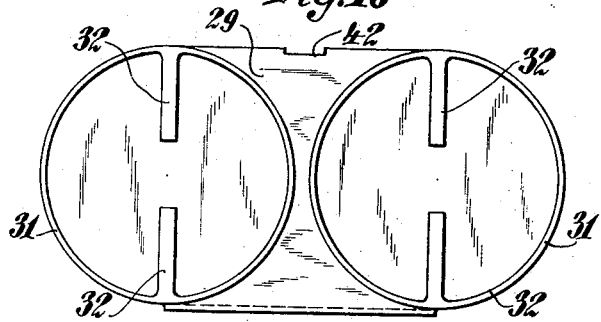
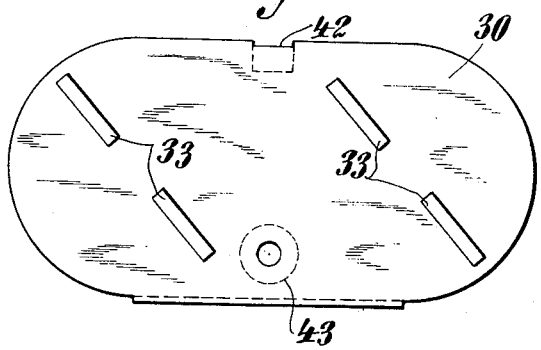
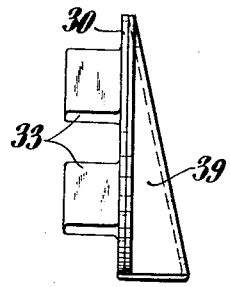
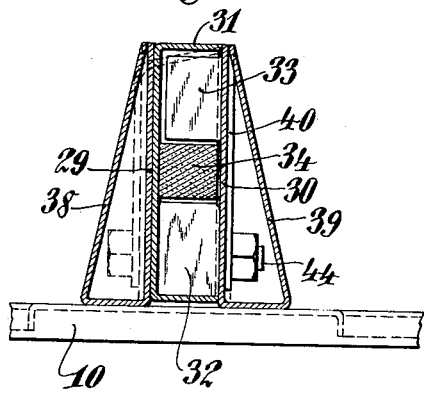
INVENTOR
Alfred F. Masury,
BY Redding, Greeley, O'Shea & Campbell
HIS ATTORNEYS Patented July 18, 1933                                                    1,918,853

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

ENDLESS TRACK FOR MOTOR VEHICLES

Application filed February 10, 1932. Serial No. 592,058.

The present invention relates to drives for motor vehicles and embodies, more specifically, a drive utilizing an endless track which bears upon the surface over which the vehicle is moving to increase the surface contact between the vehicle and terrain. More particularly, the invention embodies an improved track construction for vehicles having a plurality of wheels adapted to receive an endless track, the construction being such that a predetermined cushioning effect takes place between the articulated elements of the track.

The invention further contemplates the provision of a track of the above character wherein cushioning means is provided between each of the links of an endless track for motor vehicles whereby relative movement of the track elements is resisted.

A further object of the invention is to provide an improved cushioning means of the above character wherein the track elements are connected together by yielding connections which offer greater resistance to relative movement of the elements with respect to each other in one direction than in another direction.

A further object of the invention is to provide an endless track construction of the above character wherein the elements are so formed as to facilitate the manufacture and assembly of the track and to enable the track to offer a materially greater resistance to flexing in one direction than in another.

Further objects, not specifically enumerated above, will be apparent as the invention is described in greater detail in connection with the accompanying drawings, wherein:

Figure 1 is a view in section, taken transversely through a track constructed in accordance with the present invention, the view being taken on the section line 1—1 of Figure 2, and looking in the direction of the arrows.

Figure 2 is a view in section, taken on line 2—2 of Figure 1, and looking in the direction of the arrows.

Figure 7 is a view similar to Figure 1, showing a modified form of belt.

Figure 8 is a view, in section, taken on line 8—8 of Figure 7, and looking in the direction of the arrows.

Figure 9 is a view in section, taken on the broken line 9—9 of Figure 8, and looking in the direction of the arrows.

Figure 10 is a view in side elevation, showing one of the connecting links of the track constructed in accordance with the present invention.

Figure 11 is a view in end elevation, showing the link of Figure 10.

Figure 12 is a view in side elevation showing a form of link which is adapted to cooperate with the link construction shown in Figure 10.

Figure 13 is a view in end elevation showing the link of Figure 12.

Figure 3:
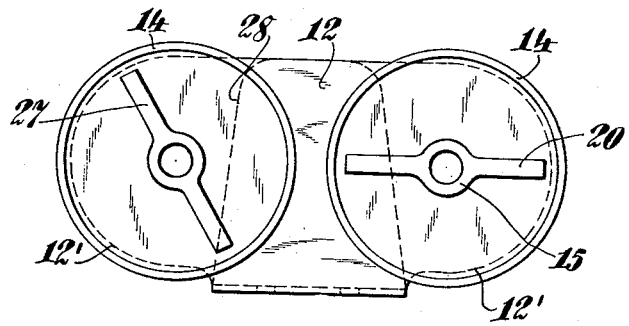
Figure 3 is a detail view showing a link adapted to be connected as described hereinafter to form an endless track.

Referring to the construction shown in Figures 1, 2, 3, 4, 5, and 6, a track or belt construction is shown as including a plurality of treads 10 upon opposite sides of the intermediate plane of which vehicle tires 11 are adapted to engage. Each tread has mounted thereon a plate 12, the plate being secured to the tread by means of rivets 13. Each plate is formed with a curved portion 12' at either end thereof. Upon the curved portion, at one end of the plate, a housing 14 is mounted, this housing being formed of circular section and having a hub 15 which is adapted to receive a bolt 16. Within the housing 14, blocks of yielding non-metallic material 17 are mounted, these blocks being illustrated in Figure 5 as formed with radial recesses 18 which extend in planes lying at right angles to each other. A central recessed portion 19 is also formed in the block in order that it may be mounted over the hub 15 and the radial recesses are adapted to engage cooperating vanes formed in the housing 14 and cooperating elements of adjacent links. To this end, oppositely extending vanes 20 are formed on the hubs 15 of the housing 14 and are adapted to be received in the cooperating recesses 18 of the blocks 17.

Figure 4:
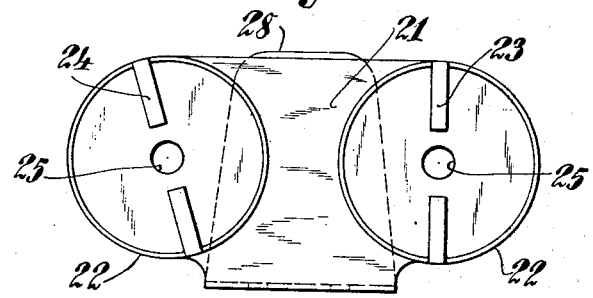
Figure 4 is a view similar to Figure 3, showing a link construction adapted to cooperate with the link shown in Figure 3.
Figure 5:
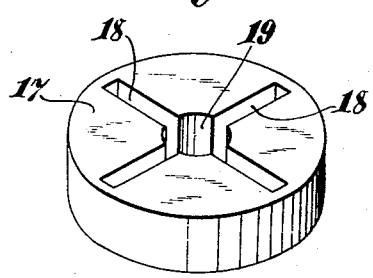
Figure 5 is a detail view in isometric projection showing a cushioning element adapted to be connected between the link sections shown in Figures 3 and 4.

Upon the next tread member of the track adjacent the tread upon which a plate 12 has been secured, a plate 21 is mounted, this plate being formed with rounded ends 22. One of the ends 22 of each of the plates 21 is formed with vertical oppositely extending vanes 23, while the other end of each of the plates 21 is formed with diagonally extending vanes 24. Apertures 25 are formed in the rounded ends at the axes thereof to receive the bolts 16, nuts 26 being provided to secure the elements in assembled position. In Figures 3 and 4, the adjacent link sections have been illustrated looking in opposite directions from the median plane of the belt or track. The link section 21 of Figure 4, in assembling the elements, is therefore faced in the direction opposite to that shown in Figure 4, in order that the right hand circular end bearing the vertical vanes 23 may cooperate with the right hand circular section of plate 12 of Figure 3 which is provided with housing 14 and horizontal vanes 20. The vanes 23 and 20 are thus received within the recesses 18 of the blocks of yielding non-metallic material shown in Figure 5, and relative movement between the plate 12 and the plate adjacent thereto to the right is thus yieldingly resisted.

Figure 6:
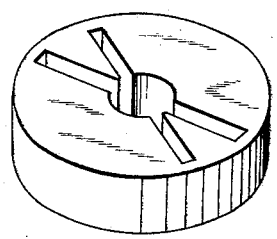
Figure 6 is a view similar to Figure 5, showing a cushioning element also adapted to be connected between the link sections of Figures 3 and 4 in alternate relationship with the cushioning elements of the type illustrated in Figure 5.

The left hand rounded end of plate 12 is also provided with a circular housing 14 within which diagonal vanes 27 are provided. These diagonal vanes cooperate with the diagonal vanes 24 of the adjacent plate 21 and blocks of yielding non-metallic material of the type shown in Figure 6 are provided in order that relative movement between the vanes 24 and 27 may be resisted. It will be seen, from an inspection of Figure 2, that the diagonal vane formation between adjacent pairs of links affords a longer cushioning column to resist relative movement between the links in one direction with less force than relative movement in the opposite direction is resisted. Relative movement in the opposite direction is resisted by the small column of yielding non-metallic material between the diagonal link sections and thus greater resistance is afforded to relative movement of the sections in such direction.

In order that the motor vehicle tires 11 may be protected, guard plates 28 are formed on each of the plates 12 and 21, thus preventing the sides of the tires contacting with the connecting elements of the links.

In the form of track shown in Figures 7 through 13, the treads are provided with links formed by plates 29 and 30. Plates 29 have circular housings 31 formed at each end thereof in which inwardly extending webs 32 are provided.

Upon plates 30 diagonal webs 33 are formed, these plates not being provided with housings in view of the fact that they are adapted to lie flush with the housings 31 of the plates 29, as seen in Figure 9. Blocks of yielding non-metallic material 34 are formed with grooves to receive the webs 32 and 33, the blocks being formed with short columns 35 and long columns 36. Within the long columns, apertures 37 are provided to increase the yielding characteristics of the long columns.

Upon the backs of plates 29 and 30, protective plates 38 and 39 are provided. The protective plates are secured together by means of straps 40 which are of U-shape and provided, upon one extremity, with an enlarged portion 41 which is adapted to overlie the rounded extremities of adjacent plates.

The other extremity of the U-shaped straps are received within recesses 42 and lie between the protective plates and the respective plates 29 and 30. Apertures 43 are formed in the protective plates 38 and 39 in order that bolts 44 may be inserted into the ends of the strap 40 and through the plates 29 and 30 to secure the elements together.

The enlarged portion 41 of the straps thus prevents the links from separating and endwise pull on the links is taken directly by the rubber blocks. The relative pivotal movement of the links with respect to each other is resisted, in one direction, by the short columns 35 of the blocks while relative pivotal movement in the other direction is resisted by the long columns 36. The webs 32 and 33 are so mounted as to cause the short columns 35 to be compressed upon relative pivotal movement of the links, such as caused by a projection in the road surface engaging the track between the supporting tires. Relative pivotal movement of the track in passing over the tires is resisted only slightly in view of the yielding nature of the long columns 36 in which recesses 37 are formed.

In this fashion, the links and treads of the endless track are normally urged outwardly or, when the track is assembled, downwardly against the terrain. Any action of the belt to force it upwardly between the wheels on its span against the terrain is resisted with a greater force than action in the reverse direction. Irregularities in the terrain thus only serve to increase the effective traction of the vehicle.

While the invention has been described with specific reference to the accompanying drawings, it is not to be limited, save as defined in the appended claims.

I claim as my invention:

1. An endless track for motor vehicles comprising a series of articulated link members, tread members connected to said link members and means associated with said link members for resisting deflection of the track inwardly and outwardly, the said means for resisting deflection inwardly being adapted to act with greater force than that resisting deflection in the opposite direction.

2. An endless track for motor vehicles comprising a series of articulated link members, tread members connected to said link members, means associated with said link members for normally urging the track outwardly, whereby the track has a normal outward bow, and means to resist deflecting movement inwardly of the track with greater force than in the opposite direction, whereby irregularities of the terrain increase the effective traction of the vehicle.

3. An endless track for motor vehicles comprising a series of articulated link members, tread members connected to said link members, a plurality of webs secured to each link member, the webs of each link member being adapted to cooperate with webs of adjacent link members, the cooperating webs being so positioned as to provide relatively large and small spaces for receiving resilient bodies, resilient bodies mounted therein serving to resist deflection of the said track from its normal position, the said relatively large and small spaces and resilient bodies therein being so positioned as to provide a greater force against movement of the track upwardly from the terrain than movement in the opposite direction.

4. An endless track for motor vehicles comprising a series of articulated link members, a tread member connected to each of said link members, a plurality of webs secured to each link member, the webs of each link member being adapted to cooperate with webs of adjacent link members, the cooperating webs being so positioned as to provide relatively large and small spaces for holding resilient material between said webs, a large body of resilient material in said larger spaces and a small body of resilient material in said smaller spaces, the said larger spaces being so positioned relative to the smaller spaces that in the flexing movement of the track, the tread members are normally urged outwardly against the terrain and action to force the track upwardly between the wheels is resisted with a greater force than action in the reverse direction.

5. An endless track for motor vehicles comprising a series of articulated link members, tread members connected to said link members, a plurality of webs secured to each link member, the webs of each link member being adapted to cooperate with webs of adjacent link members, the cooperating webs being so positioned as to provide a relatively large space in which resilient means are mounted which resists flexing of the track in one direction and a relatively small space in which resilient means are mounted which resists with greater force flexing of the track in the opposite direction upwardly from the terrain, whereby irregularities in the terrain over which said track passes serves to increase the effective traction area of said track, and guard plates cooperating with said link members to prevent engagement of the link members with the tires of a vehicle.

6. An endless track for motor vehicles comprising a series of articulated link members, tread members connected to said link members, a plurality of webs secured to each link member, the webs of each link member being adapted to cooperate with webs of adjacent link members, the cooperating webs being so positioned as to provide spaces in which a resilient block member may be mounted, a resilient block member mounted in said space to resist flexing of the track from a linear direction, said block being so proportioned and positioned with respect to said cooperating webs as to resist flexing of the track upwardly from the terrain with greater force than in the reverse direction, whereby irregularities in the terrain over which said track passes serves to increase the effective traction area of the track.

7. An endless track for motor vehicles comprising a series of articulated link members, tread members connected to said link members, a plurality of webs secured to each of said link members and extending in a radial direction from a central point, the webs of each link member being adapted to cooperate with corresponding webs of adjacent link members and so positioned as to form radial recesses having acute and obtuse angles in which bodies of resilient material are mounted, the obtuse angles being so positioned with respect to the acute angles that resilient material mounted therein operates to resist flexing of the track in a direction upwardly from the terrain with greater force than flexing thereof in the reverse direction.

8. An endless track for motor vehicles comprising a series of articulated link members, each link member comprising a vertical plate, means at each end of the plate to hinge the plates together, a plurality of oppositely extending webs arranged radially to the hinge connection, the webs of each plate lying at an angle to the cooperating webs on the adjacent plate, a block of cushioning material having radial recesses therein adapted to receive cooperating webs at the said hinge connection, the said webs being arranged to form acute and obtuse angles and so positioned that the cushioning material between the acute angles serves to resist inward movement of the track and the longer column of resilient material between the obtuse angles serves to resist flexing of the track in the opposite direction.

ALFRED F. MASURY.